(12) United States Patent
Suyama et al.

(10) Patent No.: US 9,789,641 B2
(45) Date of Patent: Oct. 17, 2017

(54) BLOW MOLDING DEVICE AND METHOD FOR MANUFACTURING A CONTAINER

(71) Applicant: Discma AG, Hunenberg (CH)

(72) Inventors: Kenichi Suyama, Tokyo (JP); Nobuyuki Tamura, Tokyo (JP); Sumito Sato, Tokyo (JP)

(73) Assignee: DISCMA AG, Hunenberg (CH)

( * ) Notice: Subject to any disclaimer, the term of this patent is extended or adjusted under 35 U.S.C. 154(b) by 278 days.

(21) Appl. No.: 14/431,063

(22) PCT Filed: Aug. 1, 2013

(86) PCT No.: PCT/JP2013/004675
§ 371 (c)(1),
(2) Date: Mar. 25, 2015

(87) PCT Pub. No.: WO2014/049930
PCT Pub. Date: Apr. 3, 2014

(65) Prior Publication Data
US 2015/0246475 A1    Sep. 3, 2015

(30) Foreign Application Priority Data
Sep. 28, 2012 (JP) ................................ 2012-217260

(51) Int. Cl.
*B29C 49/46* (2006.01)
*B29C 49/28* (2006.01)
(Continued)

(52) U.S. Cl.
CPC .............. *B29C 49/28* (2013.01); *B29C 49/58* (2013.01); *B29C 49/06* (2013.01); *B29C 49/12* (2013.01);
(Continued)

(58) Field of Classification Search
CPC ...... B29C 2049/465; B29C 2049/4655; B29C 2049/4664; B29C 49/46
See application file for complete search history.

(56) References Cited

U.S. PATENT DOCUMENTS

| 2009/0218733 A1 | 9/2009 | Andison et al. |
| 2010/0025031 A1 | 2/2010 | Liu et al. |

(Continued)

FOREIGN PATENT DOCUMENTS

| JP | S60-49919 A | 3/1985 |
| JP | H07-35023 U | 6/1995 |

(Continued)

OTHER PUBLICATIONS

Nov. 19, 2013 International Search Report issued in International Patent Application No. PCT/JP2013/004675.

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

Provided is a method for manufacturing a synthetic resin container, including: after the shaping of a container, drawing back a liquid inside the container to a pressurized liquid feeding unit side by a suckback mechanism disposed at a predetermined position in a feeding channel of the liquid from the pressurized liquid feeding unit to a mouth tube portion of a preform; closing the feeding channel by means of a valve mechanism disposed on the downstream side of the suckback mechanism; introducing a gas into the container so that the volume reduction deformation of the container resulting from the drawing back of the liquid is restored to its original shape; and adjusting a headspace inside the container with the amount of volume change associated with the volume reduction deformation.

13 Claims, 16 Drawing Sheets

(51) Int. Cl.
  *B29C 49/58* (2006.01)
  *B29C 49/06* (2006.01)
  *B29L 31/00* (2006.01)
  *B29C 49/12* (2006.01)
  *B29C 49/42* (2006.01)
  *B67C 3/22* (2006.01)

(52) U.S. Cl.
  CPC .. *B29C 49/4289* (2013.01); *B29C 2049/4294* (2013.01); *B29C 2049/465* (2013.01); *B29C 2049/4664* (2013.01); *B29C 2049/5803* (2013.01); *B29L 2031/7158* (2013.01); *B67C 2003/227* (2013.01)

(56) References Cited

U.S. PATENT DOCUMENTS

| | | |
|---|---|---|
| 2011/0135778 A1 | 6/2011 | Andison et al. |
| 2011/0268855 A1 | 11/2011 | Chauvin et al. |
| 2011/0300249 A1 | 12/2011 | Andison et al. |

FOREIGN PATENT DOCUMENTS

| | | |
|---|---|---|
| JP | 2000-043129 A | 2/2000 |
| JP | 2003-251685 A | 9/2003 |
| JP | 2010-043129 A | 2/2010 |
| JP | 2011-506130 A | 3/2011 |

PRIOR ART

BLOW MOLDING DEVICE AND METHOD FOR MANUFACTURING A CONTAINER

TECHNICAL FIELD

The present invention relates to a blow molding device, and a method using the same for manufacturing a synthetic resin container.

BACKGROUND

A biaxially-stretch-blow-molded container made of polyethylene terephthalate (PET) resin or of polypropylene (PP) resin exhibits numerous excellent properties, and is thus used in various fields.

In general, such container is molded from an injection-molded preform in a bottomed cylindrical shape, which is stretched and deformed into an expanded shape as being heated to a temperature at which a stretching effect is observed.

In other words, as shown in FIG. 16 (corresponding to FIG. 12 of PTL 1), a preform 31 heated to a temperature which renders a stretching effect is installed into a blow mold 101 in a state where the mouth tube portion 32 is protruding above and a neck ring 33, which is integrally formed circumferentially on the lower edge of the outer circumferential surface of the mouth tube portion 32 of the preform 31, is engaged with a neck supporting flange portion 103. Further, with a guide tube portion 110 as the tip of the blow nozzle 104 being loosely fitted into the mouth tube portion 32 of the preform 31, the preform 31 is stretched in the axial direction by means of a stretching rod 108 inserted through an insertion hole 111 formed by penetrating the central portion of a blow nozzle 104 while being simultaneously stretched in a radial direction by means of a blow air serving as a pressurized fluid blown through the insertion hole 111, to thereby mold a container (bottle body) 41.

Further, PTL 2 discloses an invention relating to a method for blow molding a preform using a liquid, instead of a blow air, as a pressurized fluid.

In such molding methods, a content liquid, such as beverages, cosmetics, detergents, drugs, and the like, which are to be filled into a final product may be used as the liquid, so as to eliminate the filling process, to thereby simplify the production line.

CITATION LIST

Patent Literature

PTL 1: JP2003-251685A
PTL 2: JP2000-043129A

SUMMARY

Here, in the case of using a pressurized liquid in the blow molding as disclosed in PTL2, the molded container is impregnated with a liquid and the liquid would scatter out from the mouth tube portion to the peripheral outside when disengaging the blow nozzle from the mouth tube portion, which makes it difficult to adjust the headspace of the content fluid to a constant value, with the result that the headspace varies depending on the product, leading a problem in merchantability in some cases.

The present invention has been conceived in light of such technical problems, and has an object of providing a blow molding device that uses, as a pressurized fluid, beverages, cosmetics, drugs, and the like which are to be filled into the final product, the device being capable of adjusting with high precision and productivity the headspace of the container being filled with a content liquid simultaneously with the molding thereof.

The present invention relates to a blow molding device, and a method for manufacturing a synthetic resin container using the device. The following first describes a method for manufacturing a container, and then describes a blow molding device.

In order to solve the aforementioned problems, there is provided a method for manufacturing a container according to the present invention which mainly includes:

tightly fitting a blow nozzle into a mouth tube portion of a preform in a bottomed cylindrical shape which is installed into a mold for blow molding; feeding a liquid into the preform from a pressurized liquid feeding unit through the blow nozzle so as to shape the container into an expanded shape along a cavity surface of the mold, the method including:

after the shaping of the container, drawing back the liquid inside the container to a pressurized liquid feeding unit side by means of a suckback mechanism disposed at a predetermined position in a liquid feeding channel from the pressurized liquid feeding unit to the mouth tube portion of the preform; closing the feeding channel by means of a valve mechanism disposed on the downstream side of the suckback mechanism; introducing a gas into the container so as to restore, to its original shape, the volume reduction deformation of the container resulting from the drawing back of the liquid; and adjusting a headspace inside the container through the amount of volume change associated with the volume reduction deformation.

According to the aforementioned manufacturing method, the shaped container is once impregnated with a content liquid, and part of the content liquid impregnated in the container is drawn back (hereinafter, referred to as "suckback") to the pressurized liquid feeding unit side by means of a suckback mechanism, so that the inside of the container is evacuated due to the suck back, causing volume reduction deformation in the circumferential wall.

Next, with the container being volume reduction deformed, the feeding channel is closed by means of the valve mechanism, so as to introduce a gas into the container through an intake hole etc. of the blow nozzle, the intake hole being disposed on the downstream side of the valve mechanism, so that the inside of the container returns to ordinary pressure, with the result that the volume reduction deformation is eliminated and the container is restored to its original shape.

Then, it is possible to adjust the headspace inside the container for the volume by which the container is restored to its original shape from the volume reduction deformation, i.e., the amount of volume change associated with the volume reduction deformation caused by the suckback.

It should be noted that, in the aforementioned configuration, the feeding channel defined as "feeding channel from the pressurized liquid feeding unit to the mouth tube portion of the preform" is inclusive of the pressurized liquid feeding unit itself.

According to another configuration of the method for manufacturing a container of the present invention, in the aforementioned main configuration, the pressurized liquid feeding unit employs a plunger pump, and the plunger pump is provided with a suckback mechanism implemented through the drawing back operation of a plunger constituting the plunger pump.

The aforementioned configuration is one example of how to dispose the suck back mechanism, in which a plunger pump is used in the pressurized liquid feeding unit, and the plunger constituting the plunger pump is configured to be operable in the drawing back direction, that is, in a direction reverse to the liquid supply direction.

Here, the operation of the plunger may be controlled by means of a servo mechanism using a servo motor, which makes it possible to control the suckback timing and the suckback volume with high precision, to thereby adjust the headspace inside the container with high precision and productivity.

It is obvious that the way of disposing the suckback mechanism is not limited to the aforementioned configuration, and the suckback mechanism may be disposed separately from the pressurized liquid feeding unit to a predetermined position in the liquid feeding channel from the pressurized liquid feeding unit to the blow nozzle, considering productivity, controllability of the headspace, etc.

According to still another configuration of the method for manufacturing a container of the present invention, in the aforementioned main configuration, the blow nozzle has a liquid feeding channel serving as an in-nozzle feeding channel, the in-nozzle feeding channel having a valve mechanism disposed therein.

The valve mechanism may be disposed at an appropriate position on the downstream side of the suckback mechanism, in the liquid feeding channel from the pressurized liquid feeding unit to the blow nozzle. When the valve mechanism is disposed in the in-nozzle feeding channel, i.e., the liquid feeding channel inside the blow nozzle, and more preferably, on the downstream side end of the in-nozzle feeding channel, namely at a position in the vicinity of directly above the upper end of the mouth tube portion of the preform installed in the forming device, it is possible to adjust with high precision the liquid volume to be finally filled into the container.

According to yet another configuration of the method for manufacturing a container of the present invention, in the aforementioned main configuration, after closing the feeding channel by means of the valve mechanism, a pressurized gas is introduced into the container so as to restore the volume reduction deformation of the container to its original shape.

According to the aforementioned manufacturing method, the introduction of a pressurized gas into the container reliably allows the volume reduction deformation to be rapidly restored to its original shape.

In addition, even if the circumferential wall of the container has experienced some irregular depressive deformations during the volume reduction deformation, the use of a pressurized gas reliably ensure restoration to its original shape.

According to a further configuration of the method for manufacturing a container of the present invention, the blow nozzle includes a stick-shaped rod that is inserted through the blow nozzle as being arranged in a manner movable along the axial direction of said blow nozzle, so that the rod is operated to be inserted into the container and removed from the container, to thereby complement the function of adjusting the headspace implemented by means of the suckback mechanism.

Depending on the volume of the headspace, there may be a limit in the function of adjusting the headspace only by means of the suck back mechanism, when consideration is given to the recovering property of the container after volume reduction deformation and the productivity. However, the function of adjusting the headspace through the suck back mechanism may be complemented by the function of the rod which is inserted into the container and removed therefrom as mentioned above, it is possible to adjust the headspace in a wider range and with higher productivity.

According to a still further configuration of the method for manufacturing a container of the present invention, in the aforementioned main configuration, the rod is used as a stretching rod, and the preform is longitudinally stretched with said stretching rod either before the process of shaping, with a liquid, the preform into an expanded shape or simultaneously with the process of shaping the preform into an expanded shape.

With the aforementioned configuration, it is possible to manufacture more various containers, by combining longitudinal stretching performed by the stretching rod and expanding stretching performed with a pressurized liquid.

According to a yet further configuration of the method for manufacturing a container of the present invention, in the aforementioned main configuration, the container is configured as a pouch-shaped and thin-walled container in which the horizontal cross section of the barrel portion is flat.

According to yet further configuration relating to the method for manufacturing a container of the present invention, in the aforementioned main configuration, the container has a decompression absorbing panel disposed to the circumferential wall of the barrel portion.

The method for adjusting the headspace in the manufacturing method of the present invention utilizes volume reduction deformation of the container caused by suckback. In the case where it is necessary to enlarge the volume of the headspace, or in the case where operations associated with suckback are performed rapidly from the viewpoint of productivity, the circumferential wall may suffer a local depressive deformation, and such deformation may not be restored afterwards despite the introduction of a gas into the container, or may be whitened in a plastic-deformed portion even if the deformation was restored. The aforementioned two configurations are aimed at solving such problems involved in volume reduction deformation.

A pouch container is basically a small-bag-shaped container formed of two flexible synthetic resin films which are pasted together by heat seal through a peripheral portion thereof, and is frequently used as a container for retort pouch food or for detergent refill, etc. The pouch container is characterized in that the horizontal cross section of the circumferential wall thereof is flat in shape and formed with thin wall, and is capable of being deformed freely depending on the volume of the content, the pressure inside, or through squeezing operation, etc.

The container configured as described above is a blow molding container having the features of such pouch container. In a container of this type, the circumferential wall of the barrel portion includes flat-deformed front and back walls opposing to each other, which are further flat-deformed due to suckback to smoothly attain volume reduction deformation, and the volume reduction deformation can be easily restored to its original shape through successive introduction of a gas at ordinary pressure.

A description is given of a container provided with a decompression absorbing panel. Conventionally, there has been employed a so-called high-temperature filling as a method for filling fruit juice beverage, tea, etc., which require sterilization, into a synthetic resin bottle body such as PET bottle. The method includes: filling a content liquid at a temperature around 90° C. into a bottle body; capping, sealing, and cooling the bottle afterwards. According to the method, the pressure inside the bottle significantly reduces when cooled, and thus it has conventionally been a general practice to use, for such application which involves the aforementioned high-temperature filling, a bottle having a flat decompression absorbing panel disposed on the circumferential wall of the barrel portion so as to serve a function of absorbing the reduced pressure therein.

The container configured as described above uses a decompression absorbing panel having such a decompression absorbing function in order to avoid a local depressive deformation, to thereby achieve smooth progress of volume reduction deformation.

As an alternative means for serving the decompression absorbing function other than the decompression absorbing panel, there may also be employed means for subjecting the bottom wall in the bottom portion to decompression deformation.

Next, there is provided a blow molding device according to the present invention, which mainly includes:

a mold for blow molding; and a blow nozzle tightly fitted into a mouth tube portion of a preform in a bottomed cylindrical shape which is installed into the mold, the device including a pressurized liquid feeding unit for feeding a liquid, via the blow nozzle, into the preform, to thereby shape a container into an expanded shape along a cavity surface of the mold, in which:

a suckback mechanism is disposed at a predetermined position in the liquid feeding channel from the pressurized liquid feeding unit to the mouth tube portion of the preform in order to draw back the liquid from an inside of the shaped container to the pressurized liquid feeding unit side, and a valve mechanism is disposed to a downstream side of the position whereto said suckback mechanism is disposed, which allows to open and close the feeding channel.

According to another configuration of the blow molding device of the present invention, in the aforementioned main configuration, the pressurized liquid feeding unit employs a plunger pump, the plunger pump being provided with a suckback mechanism implemented through a drawing back operation of a plunger constituting the plunger pump.

According to still another configuration of the blow molding device of the present invention, in the aforementioned main configuration, a valve mechanism is disposed in an in-nozzle feeding channel serving as a liquid feeding channel inside the blow nozzle.

According to yet another configuration of the blow molding device of the present invention, in the aforementioned configuration, a rod-shaped seal body is inserted into the blow nozzle as being arranged in a manner movable in the axial direction of the blow nozzle, the seal body is configured to abut against a seal step formed on the inner circumferential surface of the nozzle so as to close the in-nozzle feeding channel, and the tip of the seal body abuts against and detaches from the seal step so as to constitute a valve mechanism.

The aforementioned configuration relates to a specific configuration for disposing the valve mechanism in the in-nozzle feeding channel serving as a liquid feeding channel inside the blow nozzle, in which the feeding channel can reliably be opened and closed in a short time through the moving operation of the rod-shaped seal body which is inserted into the blow nozzle as being arranged in a manner movable in the axial direction of the blow nozzle.

According to a further configuration of the blow molding device of the present invention, in the aforementioned configuration, the seal body is obtained by inserting a rod into a cylindrical-rod-shaped axial body in a fluid-tight and slidable manner.

According to the aforementioned configuration, the rod inserted fluid-tightly and slidably into the cylindrical-rod-shaped shaft body can be operated to be moved in a mode different form the moving operation of the shaft body, so as to allow the rod to be used as a member for controlling the headspace inside the molded container to a predetermined volume, which makes it possible to complement the function of adjusting the headspace through suckback, to thereby adjust the headspace more variously.

In addition, the rod may also be used as a stretching rod for longitudinally stretching of the preform.

According to a still further configuration of the blow molding device of the present invention, in the aforementioned main configuration, the device is configured to allow a pressurized gas into the container, with the valve mechanism being closed.

According to the blow molding device and the method for manufacturing a container using the same of the present invention configured as described above, the suckback mechanism sucks back, to the pressurized liquid feeding unit side, part of the liquid impregnated into the container so as to reduce the pressure inside the container, to thereby cause volume reduction deformation on the circumferential wall. However, through the introduction of a gas into the container in the aforementioned state, the inside of the container returns to ordinary pressure, eliminating the volume reduction deformation, to thereby allow the container to be restored to its original shape. In this way, the amount of volume change by which the container is recovered from the volume reduction deformation condition to its original state allows for adjusting the headspace inside the container with high precision and productivity.

BRIEF DESCRIPTION OF THE DRAWINGS

The present invention will be further described below with reference to the accompanying drawings, wherein.

DETAILED DESCRIPTION

In the following, embodiments of the present invention are described according to Examples while referring to the accompanying drawings.

FIGS. 1 to 5 are views for illustrating an embodiment of the blow molding device of the present invention, and further, for illustrating a method (the blow molding process) for manufacturing the container using the same.

Figure 1:
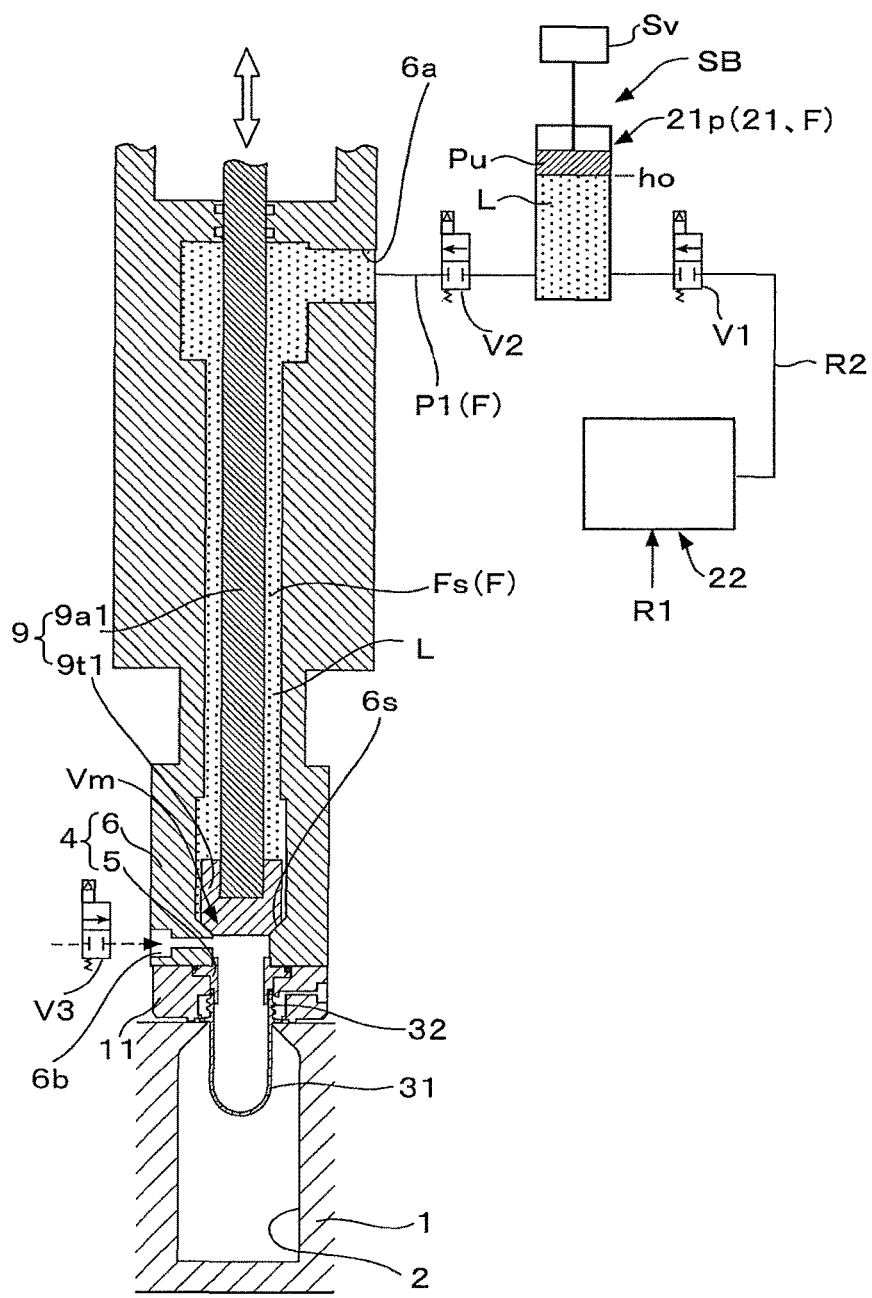
FIG. 1 is a schematic illustration of an example of an overall configuration of the blow molding device of the present invention.
Figure 2:
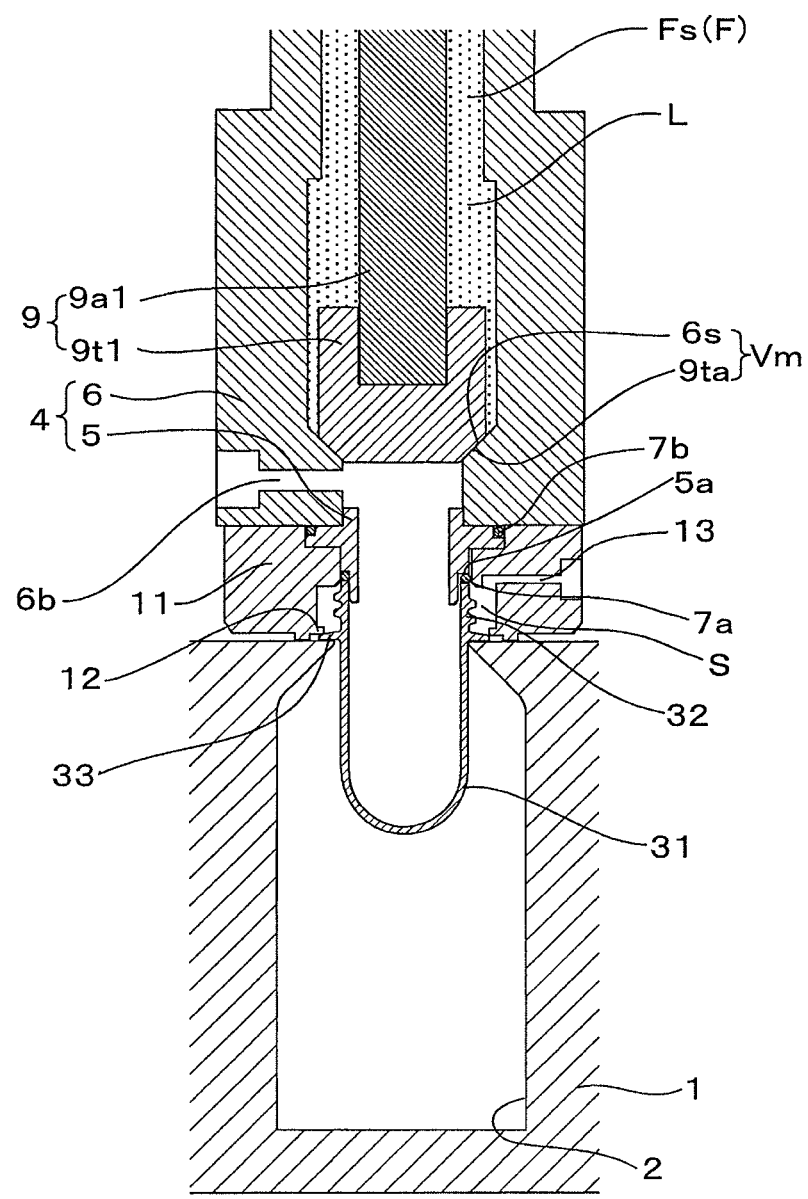
FIG. 2 is an enlarged cross section of the lower portion of the main part of the device of FIG. 1.

First, the overall configuration of the device is described with reference to FIGS. 1 and 2. FIG. 1 is a schematic illustration of the overall configuration of the blow molding device, and FIG. 2 is an enlarged cross section of the lower portion of the main part of the device illustrated as a longitudinal cross-sectional view in FIG. 1.

FIG. 1 illustrates a preform 31 which is installed into a mold 1, with the tip of a blow nozzle 4 being fitted into a mouth tube portion 32 of the preform 31.

The preform 31 used herein is in the form of a bottomed cylindrical test tube having the mouth tube portion 32 disposed upright at the upper end thereof, the mouth tube portion 32 being provided, at the lower end thereof, with a neck ring 33. The preform 31 is installed into the mold 1 with the mouth tube portion 32 protruding outside (upward in FIGS. 1 and 2).

The main part of the device contains the mold 1, a partitioning member 11, and the blow nozzle 4, while having a pressurized liquid feeding unit 21 and a liquid adjusting unit 22 as accessory equipment.

As illustrated in FIG. 2, the partitioning member 11 is disposed above the mold 1 so as to surround an outer circumferential surface of the mouth tube portion 32 of the preform 31 with a space S therebetween, the mouth tube portion 32 protruding above the mold 1.

An intake hole 13 is formed, as necessary, in the partitioning member 11 so as to allow a pressurized gas to be fed into the space S.

The partitioning member 11 has a supporting flange piece 12 disposed circumferentially around the lower end thereof, which is closely abutted to the neck ring 33 of the preform 31 from above, to thereby hold the preform 31 in the installed position.

The blow nozzle 4 is generally tubular in shape, which is configured by including a tube fitting piece 5 and a feed tube 6, which are coupled tightly with a seal member 7b.

The tube fitting piece 5 has a columnar cavity therein and includes, on the outer peripheral wall thereof, a circumferential step 5a that reduces in diameter towards the tip, as illustrated in FIG. 2. When the tip in a cylindrical shape is fitted into the mouth tube portion 32 of the preform 31, the circumferential step 5a abuts against the upper end surface of the mouth tube portion 32 via a seal member (O ring) 7a therebetween, so that the blow nozzle 4 and the mouth tube portion 32 are tightly coupled to communicate with each other.

The feed tube 6 is generally a member that has a columnar cavity therein, and has an introduction channel 6a for a liquid L. The introduction channel 6a is disposed at the upper end of the feed tube 6 while penetrating through the circumferential wall as illustrated in FIG. 1.

The feed tube 6 has, at the lower end thereof, a seal step 6s circumferentially formed on the inner peripheral surface, the seal step 6s being inclined as being reduced in diameter downwards.

Below the seal step 6s, an intake hole 6b is disposed for communication between the inside and outside of the feed tube 6, and the intake hole 6b is opened and closed with a valve V3.

Inside the blow nozzle 4 composed of the tube fitting piece 5 and the feed tube 6 as described above, an elongated rod-shaped seal body 9 is disposed as being inserted in the axial direction (in the vertical direction of FIG. 1).

Here, the seal body 9 is formed by including a bottomed short cylindrical tube sealing piece 9t1 which is coaxially fitted into and assembled onto a shaft 9a1 in an elongated columnar rod shape. The outer peripheral edge of the lower end surface of the tube sealing piece 9t1 is chamfered so as to form a tapered edge 9ta.

Figure 3:
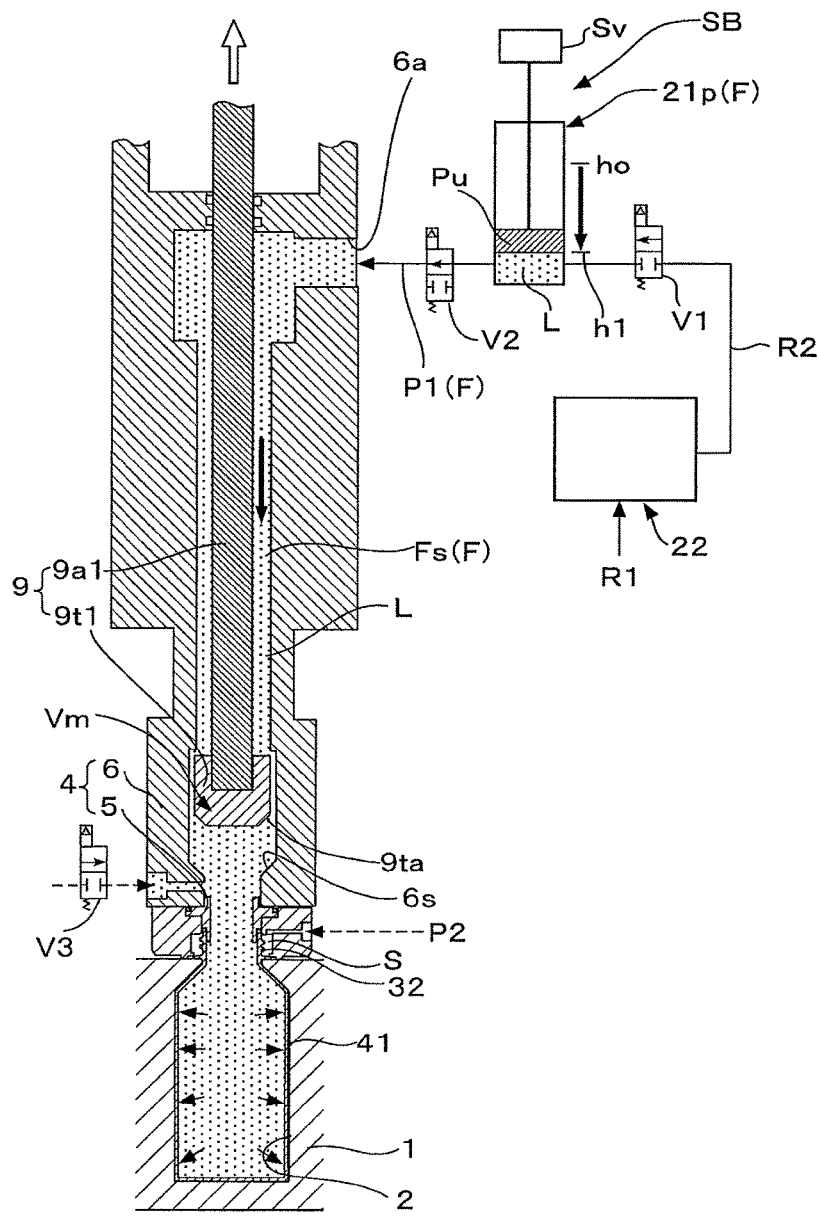
FIG. 3 is a cross section of the device in a state where the container is shaped by stretching the preform into an expanded shape with a pressurized liquid, in the manufacturing process according to the device of FIG. 1.

The blow nozzle 4 and the seal body 9 form a cylindrical in-nozzle feeding channel Fs in the blow nozzle 4, along the axial direction of the blow nozzle 4, the feeding channel Fs communicating with the inside of the preform 31. The seal body 9 may be lowered to cause the tapered edge 9ta of the tube sealing piece 9t1 to abut against the seal step 6s circumferentially provided on the inner circumferential surface at the lower end of the feed tube 6, as illustrated in FIGS. 1 and 2, so as to close the communication of the in-nozzle feeding channel Fs into the preform. Further, the seal body 9 may be raised as illustrated in FIG. 3, so as to open the communication. The abutment of the tapered edge 9ta against the seal step 6s and release of the abutment constitute a valve mechanism Vm.

Next, description is given of the pressurized liquid feeding unit 21 and the liquid adjusting unit 22, which are disposed as accessory equipment.

The pressurized liquid feeding unit 21 employs a plunger pump 21p having a plunger Pu inserted therein, in which the operation of the plunger Pu is controlled with a servo mechanism Sv provided with a servo motor (omitted from the drawings).

The plunger Pu may be moved downwards in the drawing so as to feed the liquid L into the preform 31, and the plunger Pu may be moved upwards so as to suckback the liquid L from the shaped container 41.

A feeding channel F of the liquid L from a plunger pump 21p serving as the pressurized liquid feeding unit 21, to the mouth tube portion 32 of the preform 31 is formed by the plunger pump 21p, piping P1, and the in-nozzle feeding channel Fs inside the blow nozzle 4.

The liquid adjusting unit 22 has a function of heating and adjusting the liquid L to a certain temperature while newly supplying the same from the piping R1 so as to feed the liquid L thus heated and adjusted to the pressurized liquid feeding unit 21 through piping R2. The blow molding device includes a number of valves that open and close the flow channels as necessary throughout the blow molding process. FIG. 1 shows three electromagnetic valves V1, V2, and V3.

Next, referring to FIGS. 1 to 5, a description is give of a method for manufacturing a synthetic resin container using the above-illustrated blow molding device, i.e., a blow molding process.

To accomplish blow molding, processes (1) to (6) below are sequentially performed.

(1) First, the preform 31 that is heated, except for the mouth tube portion 32 thereof, to a temperature suited for blow molding is installed into the mold 1 for blow molding and clamped, with the mouth tube portion 32 protruding upwards.

(2) Next, the partitioning member 11 and the blow nozzle 4 which are assembled and fixed are lowered from above of the mouth tube portion 31, so that the tip of the tube fitting piece 5 is fitted into the mouth tube portion 32 to be in a state illustrated in FIGS. 1 and 2. Here, the tapered edge 9ta of the tube sealing piece 9t1, which forms the tip of the seal body 9, abuts against the seal step 6s of the feed tube 6 to close the valve mechanism Vm. The valves V1, V2, and V3 are all closed.

(3) Next, the seal body 9 is raised as illustrated in FIG. 3 from the state in FIG. 1 so as to open the valve mechanism Vm, to thereby open the valve V2, the plunger Pu of the plunger pump 21p is moved in the arrow direction from a position ho to a position h1, the pressurized liquid L is fed via the valve V2, the piping P2, and the in-nozzle feeding channel Fs, into the preform 31 through the mouth tube portion 32, so as to stretch the preform 31 into an expanded shape, to thereby shape the container 41 along a cavity surface 2 of the mold 1.

In this process, if the pressure of the liquid L should subject the mouth tube portion 32 to enlarging deformation, a pressurized gas may be introduced through the piping P2 into the partitioning member 11 from the intake hole 13 disposed in the partitioning member 11, so as to pressurize the space S surrounding the outer peripheral surface of the mouth tube portion 32, to thereby effectively suppress the enlarging deformation.

Figure 4:
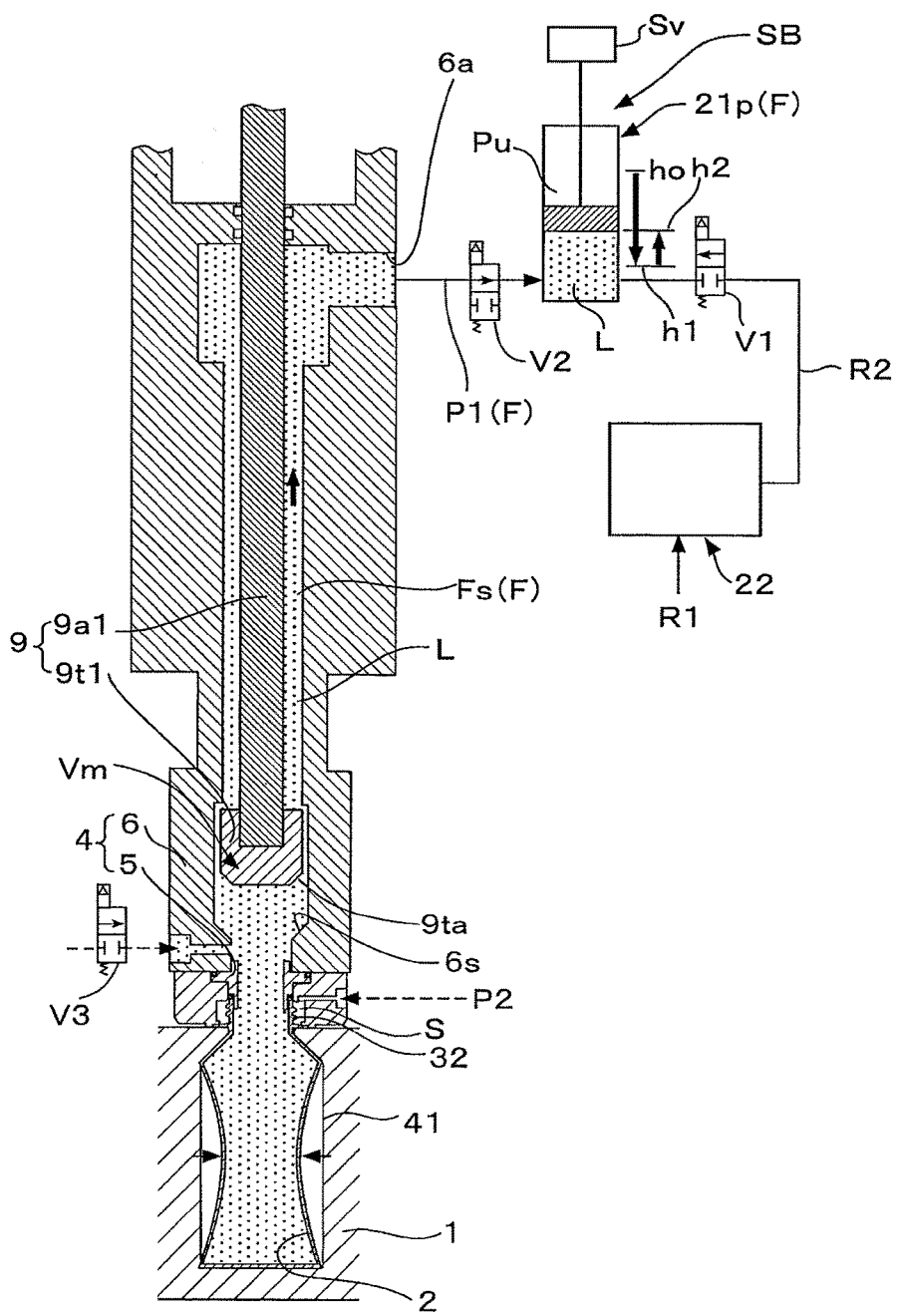
FIG. 4 is a cross section of the device in a state where the liquid is sucked back from the state in FIG. 3 in the manufacturing process according to the device of FIG. 1.

(4) Next, after the container 41 is shaped as described above, when a suckback mechanism SB of the plunger pump 21p is operated as illustrated in FIG. 4, that is, the plunger Pu is sucked back in the arrow direction from the position h1 to a position h2 so as to suck back the liquid L from the inside of the container 41 by a predetermined volume, the inside of the container 41 is evacuated, and the circumferential wall of the container 41 is subjected to volume reduction deformation as indicated by the arrows of FIG. 4.

Figure 5:
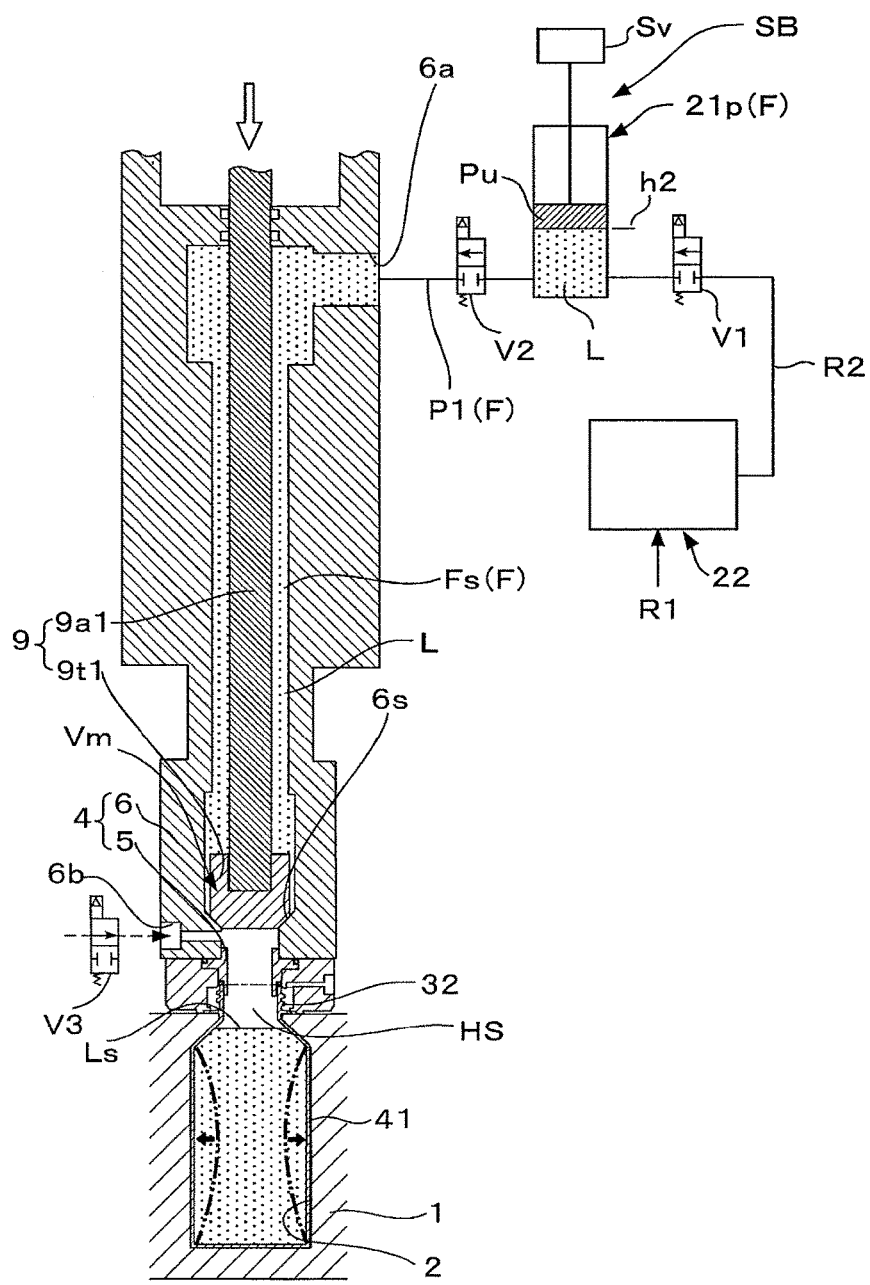
FIG. 5 is a cross section of the device in a state where the valve mechanism is closed and the outside air is introduced into the container from the state in FIG. 4, in the manufacturing process according to the device of FIG. 1.

(5) Next, as illustrated in FIG. 5, the valve V2 is closed, and the seal body 9 is lowered to close the valve mechanism Vm, so as to open the valve V3, to thereby allow a gas to be introduced from the intake hole 6b.

At this time, along with the introduction of a gas, the volume reduction deformation of the container 41 is eliminated and the shape is restored to its original shape. With the restoration of the shape, the liquid L remaining in the in-nozzle feeding channel Fs located below the valve mechanism Vm entirely flows into the container 41, and further, a liquid surface Ls inside the container 41 is lowered, making it possible to adjust the volume of a headspace HS to a predetermined value, as illustrated in FIG. 5.

Here, a pressurized gas may also be introduced through the intake hole 6b. The introduction of a pressurized gas into the container 41 can reliably restore, in a short time, the volume reduction deformation to its original shape. In addition, even if the circumferential wall of the container 41 has some irregular depression deformation resulting from the volume reduction deformations, the pressurized gas reliably enables the restoration thereof to its original shape.

(6) While omitted from the drawing, the fitting between the blow nozzle 4 and the mouth tube portion 32 of the container 41 is then disengaged, so as to open the mold 1 to take out the container 41 filled with the liquid L, and the mouth tube portion 32 is sealed with a cap to obtain a product.

Next, FIGS. 6 to 10 are for illustrating another embodiment of the blow molding device of the present invention, and further, for illustrating a method for manufacturing a container (blow molding process) using the device.

Figure 6:
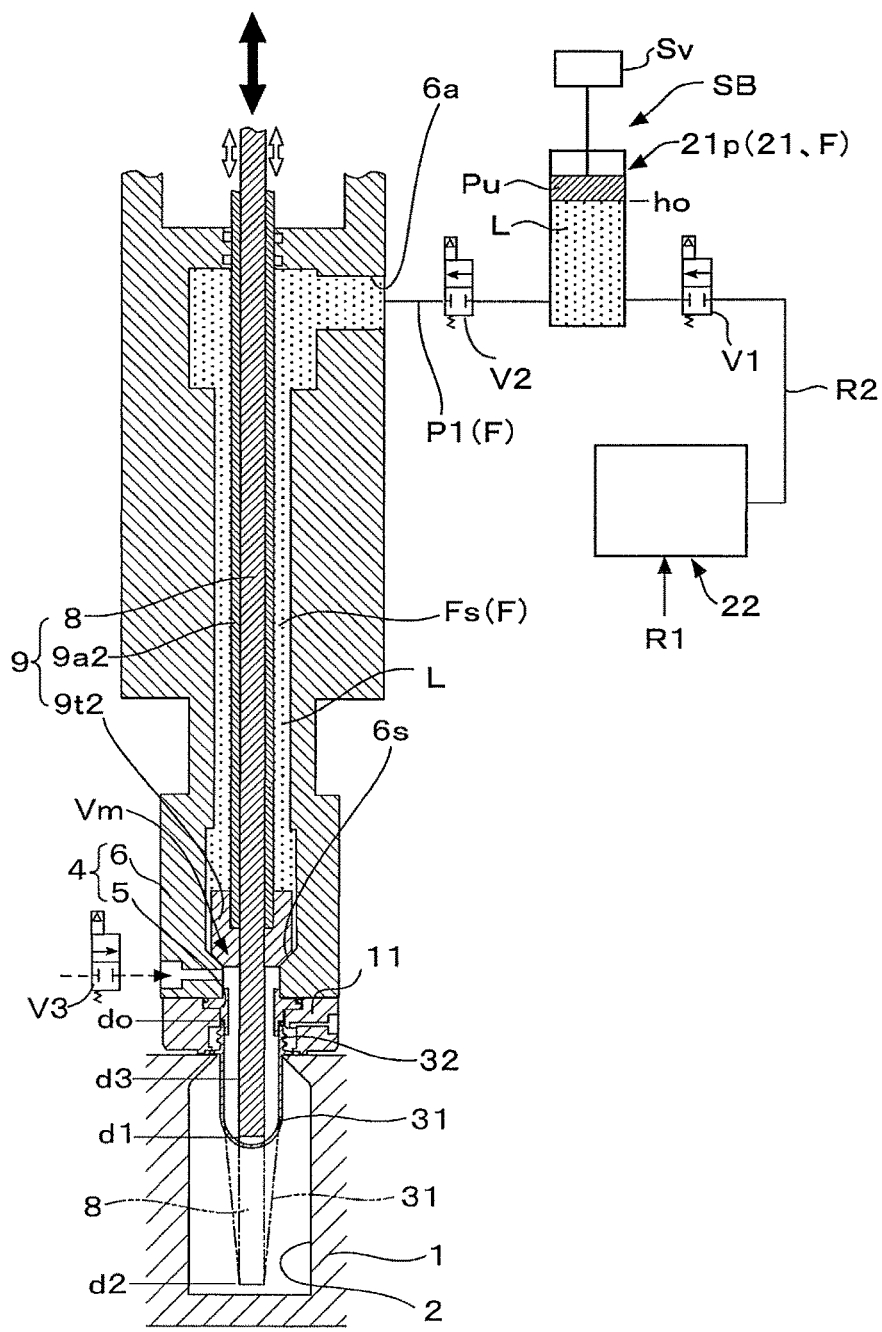
FIG. 6 is a schematic illustration of another example of an overall configuration of the blow molding device of the present invention.

FIG. 6 illustrates an overall configuration of the blow molding device, which is similar in configuration to the blow molding device of FIG. 1, except in that the seal body 9 has an elongated columnar rod 8 inserted therethrough along the central axis thereof.

Accordingly, in the following, description is mainly given of the configurations of the devices relating to the seal body 9 and the rod 8, including the features of processes or the like using the seal body 9 and the rod 8, while omitting the description that has already been made with reference to FIGS. 1 to 5 of the portions that are common to those of the aforementioned embodiment.

As illustrated in FIG. 6, the seal body 9 has the elongated cylindrical rod 8 inserted fluid-tightly and slidably through an elongated cylindrical-rod-shaped shaft body 9a2, the shaft body 9a2 having, at the tip thereof, a short cylindrical sealing tube piece 9t2 fitted coaxially thereinto, and the shaft body 9a2 and the rod 8 are configured in such a manner that both can be independently lowered and raised by means of a servo mechanism (not shown).

Then, the rod 8 may be used as a stretching rod as described later, so as to longitudinally stretch the preform 31, and may be configured to complement the function of the aforementioned suckback to adjust the headspace HS in the container 41.

Next, referring FIGS. 6 to 10, description is given of a method for manufacturing a synthetic resin container using the blow molding device described referring to FIG. 6, i.e., another example of the blow molding process. In this example, the rod 8 is intended to serve both the function as a stretching rod and the function of adjusting the headspace HS.

Processes (1) to (5) are sequentially performed to perform blow molding.

(1) First, the blow molding device and the preform 31 are set as illustrated in FIG. 6, and as shown by the two-dot chain lines in the drawing, the rod 8 is lowered in such a manner that the position of the tip of the rod 8 moves from a start position d1 to a position d2, so as to stretch the preform 31 longitudinally.

Figure 7:
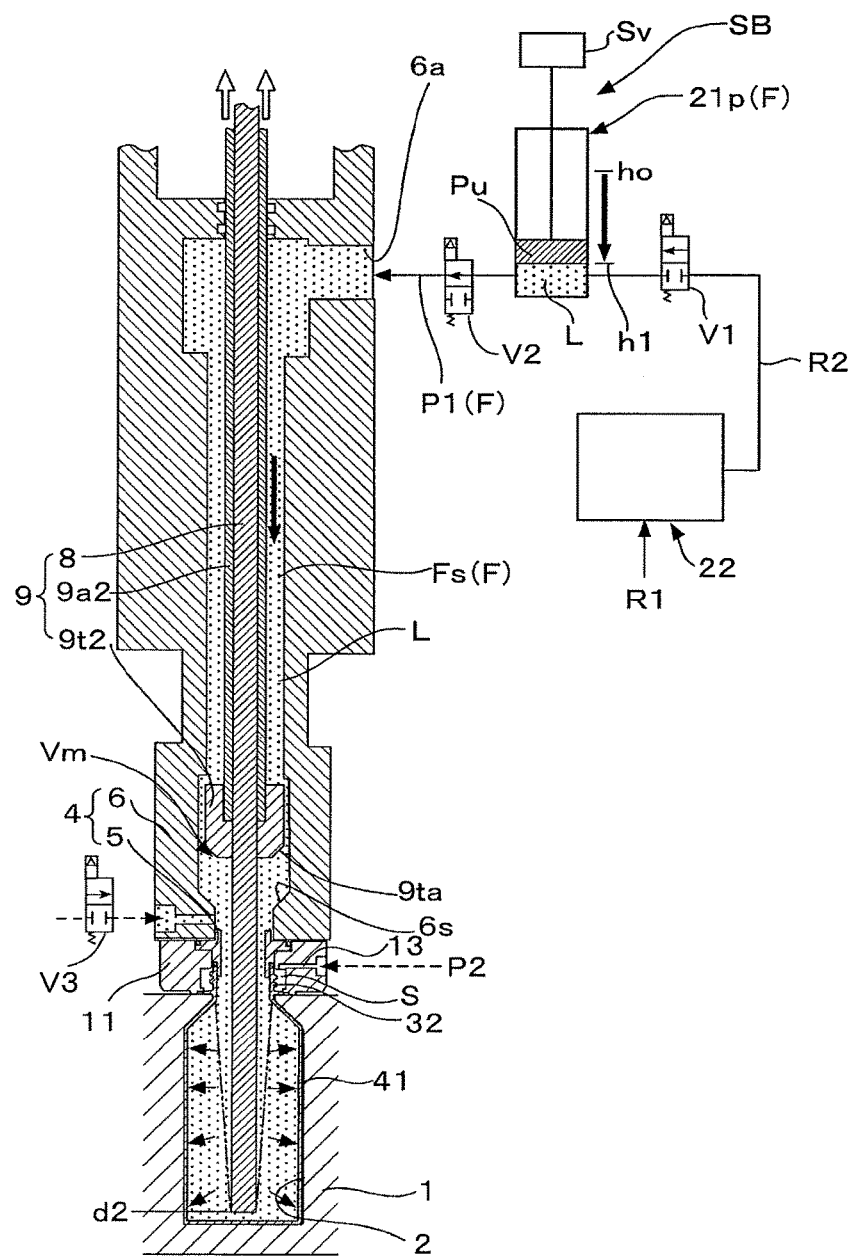
FIG. 7 is a cross section of the device in a state where the container is shaped by stretching the preform into an expanded shape with a pressurized liquid after the preform is longitudinally stretched with the rod from the state in FIG. 6, in the manufacturing process according to the device of FIG. 6.

(2) Next, the shaft body 9a2 is raised as illustrated in FIG. 7 from the state in FIG. 6 to open the valve mechanism Vm and open the valve V2, and move a plunger Pu of a plunger pump 21p from a position ho to a position h1 in the arrow direction, so that the pressurized liquid L is fed into the preform 31, and the longitudinally stretched preform 31 is stretched into an expanded shape, to thereby shape the container 41 along a cavity surface 2 of the mold 1.

Figure 8:
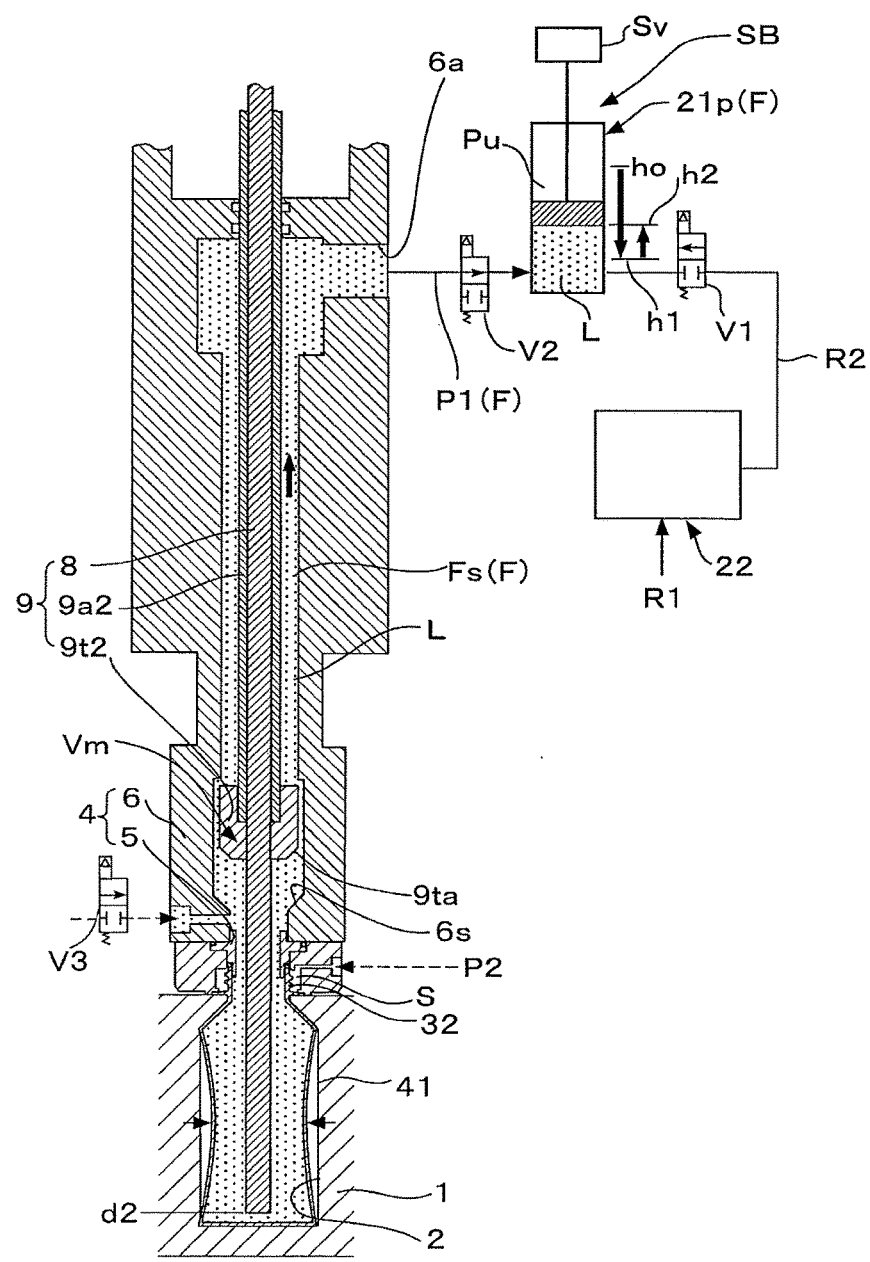
FIG. 8 is a cross section of the device in a state where the liquid is sucked back from the state in FIG. 7 in the manufacturing process according to the device of FIG. 6.

(3) Next, after the container 41 is shaped as described above, a suckback mechanism SB of the plunger pump 21$p$ is operated as illustrated in FIG. 8 to suck back the plunger Pu in the arrow direction from the position h1 to the position h2, so as to suck back a predetermined amount of the liquid L from the inside of the container 41, with the result that the inside of the container 41 is evacuated, which causes volume-reducing deformation of the circumferential wall of the container 41 as shown by the arrow in FIG. 8.

Figure 9:
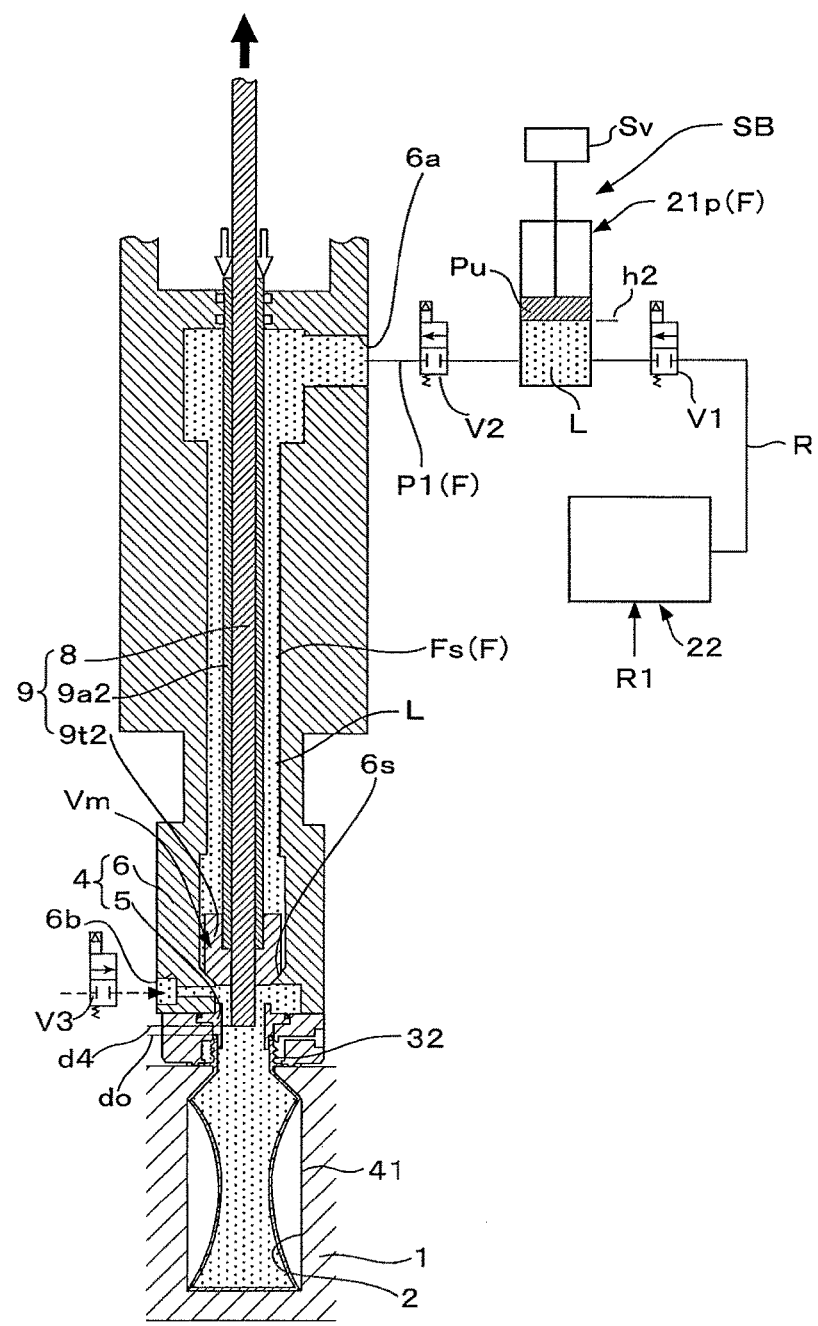
FIG. 9 is a cross section of the device in a state where the valve mechanism is closed and the rod is removed from the container form the state of FIG. 8, in the manufacturing process according to the device of FIG. 6.

(4) Next, as illustrated in FIG. 9, the valve V2 is closed and the shaft 9$a$2 is lowered to close the valve mechanism Vm, and further, the rod 8 is raised to move the tip thereof to a position d4 higher than the upper end position do of the mouth tube portion 32, to thereby disengage the tip from the inside of the container 41.

At this time, along with the raising of the rod 8, the circumferential wall of the container 41 in the state as illustrated in FIG. 8 suffers further volume reduction deformation.

Figure 10:
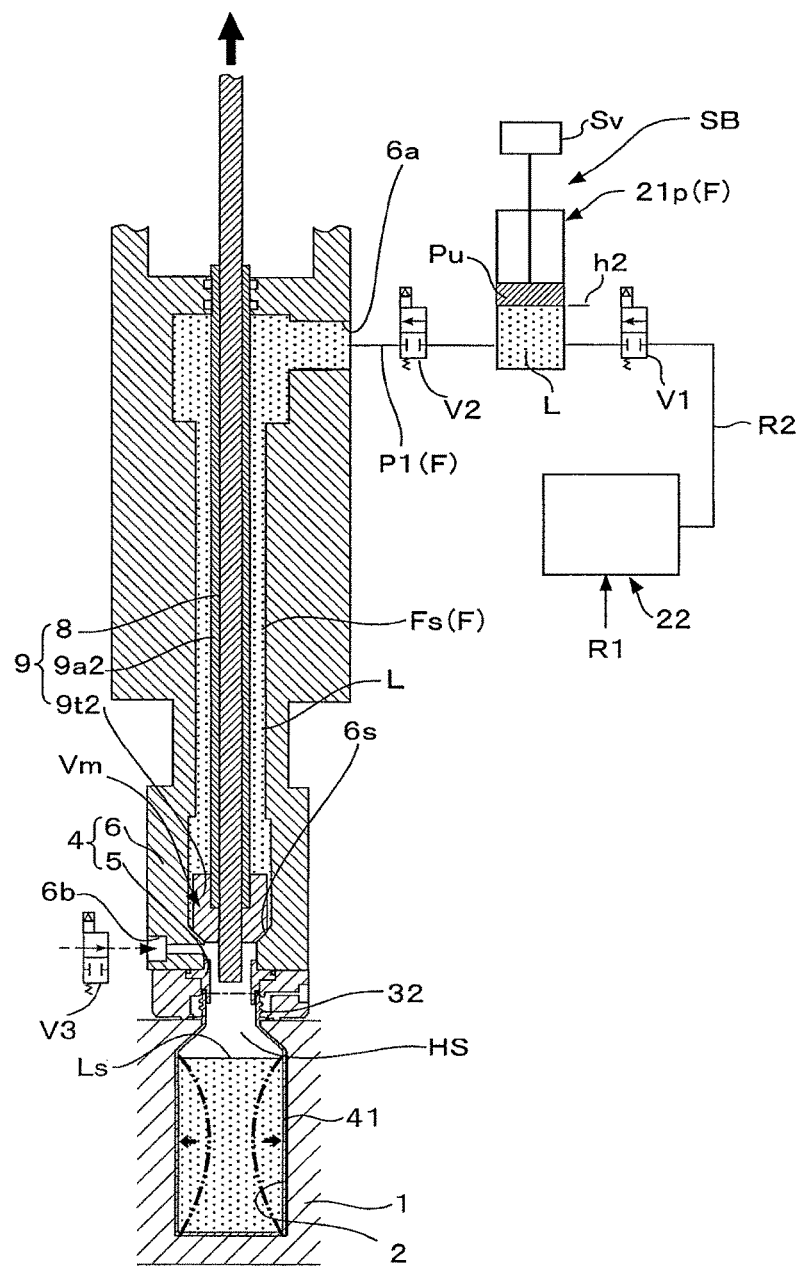
FIG. 10 is a cross section of the device in a state where the outside air is introduced into the container from the state of FIG. 9, in the manufacturing process according to the device of FIG. 6.

(5) Next, as illustrated in FIG. 10, the valve V3 is opened to introduce a pressurized gas through an intake hole 6$b$, so that the volume reduction deformation of the container 41 is eliminated along with the introduction of a gas, and restored to its original shape. Along with the restoration, the liquid L remaining in the in-nozzle feeding channel Fs disposed lower than the valve mechanism Vm all flows into the container 41, causing a liquid surface Ls inside the container 41 to be further lowered, which allows the headspace HS to be adjusted to a predetermined amount as illustrated.

In this example, the suckback amount due to the suckback mechanism SB of the plunger pump 21$p$ is added with a volume equal to the volume of a portion of the rod 8 below the mouth tube portion 32, which is illustrated in FIG. 6 (the portion of do to d2), to thereby adjust the final volume of the headspace HS.

Here, in the case of using a blow molding device provided with the rod 8, the molding process may be configured in various modes other than in the example of the molding process described referring to FIGS. 6 to 10: the timing of opening and closing of the valve mechanism Vm, the timing of moving the plug Pu in the plunger pump 21$p$ and the suckback amount thereof; the timing of the vertical movement and the insertion amount of the rod 8 into the container, etc., may be combined, in consideration of formability, productivity, necessary volume of the headspace HS, etc. of the container.

Figure 11:
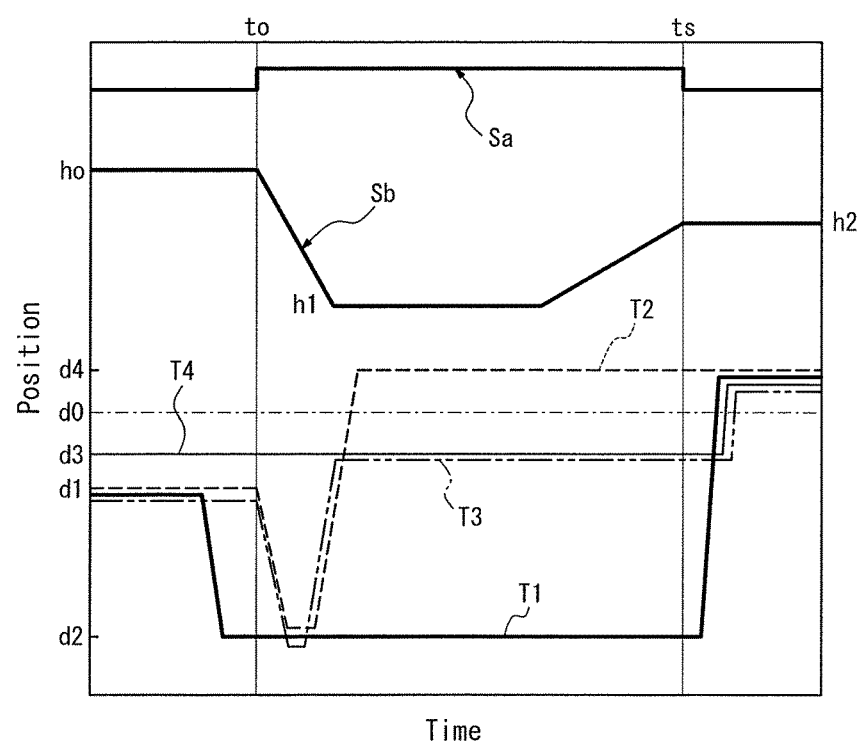
FIG. 11 is a graph schematically illustrating an example of a movement pattern of the seal body, the plunger and the rod.

FIG. 11 is to describe a variation of the molding process using the aforementioned molding device illustrated in FIG. 6, and schematically illustrates a movement pattern of the shaft 9$a$2, the plunger Pu of the plunger pump 21$p$, and the rod 8 in the vertical direction.

In FIG. 11, the horizontal axis is the time axis and the vertical axis is an axis relating to the position.

Here, a movement pattern Sa of the shaft 9$a$2 and a movement pattern Sb of the plunger Pu are the same, while the rod 8 has four different movement patterns T1, T2, T3, and T4.

In FIG. 11, time to corresponds to the time to raise the shaft 9$a$2 to open the valve mechanism Vm as illustrated in FIG. 7, and time is corresponds to the time to lower the shaft 9$a$2 to close the valve mechanism Vm as illustrated in FIG. 9.

Positions ho, h1, and h2 associated with the movement pattern Sb of the plunger Pu respectively correspond to each of the positions ho, h1, and h2 of the plunger Pu illustrated in FIG. 8.

Positions do, d1, d2, d3, and d4 associated with the movement patterns T1, T2, T3, and T4 of the rod 8 respectively correspond to each of the positions of the tip of the rod 8 illustrated in FIGS. 6 to 9.

The four movement patterns (hereinafter referred to as "patterns") T1, T2, T3, and T4 of the rod 8 are described in order in below.

The pattern T1 corresponds to the aforementioned molding process described referring to FIGS. 6 to 10.

The pattern T2 is characterized, as compared to the pattern 1, in that: the longitudinal stretching caused by the rod 8 and the expanding stretching caused by the pressurized liquid L are performed simultaneously; and that the rod 8 is removed from the inside of the container 41 within the time period during which the valve mechanism Vm is open. That is, according to the pattern T2, the rod 8 is configured to merely serve as a stretching rod, without providing the complementing function that relates to the adjustment of the headspace HS.

In other words, the headspace HS is adjusted only by means of the suckback function SB of the plunger pump 21$p$.

Further, in the pattern T2, the rod 8 is removed from the inside of the container 41 in the time period during which the valve mechanism Vm is open, and it is thus possible to avoid volume reduction deformation of the container 41 resulting from the removal of the pod 8 from the inside of the container 41.

According to the pattern T3, which is similar to the pattern T2 in that: the longitudinal stretching caused by the rod 8 and the expanding stretching caused by the pressurized liquid L are performed simultaneously; the tip of the rod 8 is raised to the position d3 inside the container 41 within the time period during which the valve mechanism Vm is open; and the rod 8 is removed from the inside of the container 41 after the valve mechanism Vm is closed.

In this way, by raising the position of the tip of the rod 8 to the position d3 within the time period during which the valve mechanism Vm is open, the rod 8 is allowed to serve a complementing function that relates to the adjustment of the headspace HS up to a volume equal to the volume of the tip of the rod 8 which is defined by the positions do to d3.

In other words, the position d3 may be adjusted as appropriate, to thereby allow the rod 8 to provide the complementing function that relates to the adjustment of the headspace HS up to an appropriate volume.

Further, in the pattern T3, the valve mechanism Vm is open in the process of raising the position of the tip of the rod 8 to the position d3 inside the container 41, and thus the container 41 would suffer no volume reduction deformation.

According to the pattern T4, the tip of the rod 8 is positioned at a position d3 inside the container 41 from the beginning, and the rod 8 is removed from the inside of the container 41 after the valve mechanism Vm is closed at the time ts. The pattern 4 allows the rod 8 to merely serve a complementing function that relates to the adjustment of the headspace HS, without exhibiting no longitudinal stretching.

Next, tested was the function of the rod 8 for adjusting the headspace HS formed in the container 41 with the suckback volume of the plunger Pu moved from h1 to h2 in FIG. 8 and in FIG. 11, according to the aforementioned pattern T2 where the rod 8 is only to serve as a stretching rod without providing the complementing function that relates to the adjustment of the headspace HS, the test results of which are described in below.

The test conditions are as follows.

1) Regarding the Blow Molded Container

Figure 12:
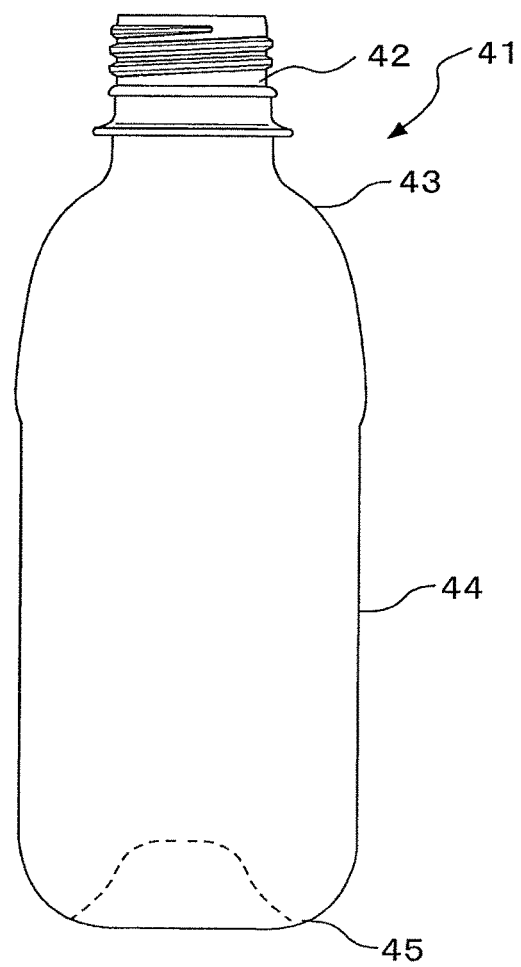
FIG. 12 is a front view illustrating an example of the container.

FIG. 12 is a front view of a container 41 molded in the present test. The container 41 is of a bottle body shape having a mouth tube portion 42, a shoulder portion 43, a cylindrical barrel portion 44, and a bottom portion 45, which was blow molded in the process according to the pattern T2 of FIG. 11, in which a preform 31 made of PP random copolymer resin or a polypropylene (PP) resin was preheated to 100° C. to 130° C., and the molding device of FIG. 6 was used, with water at normal temperature being used as the liquid L.

The full volume of the container 41 is 554 ml, and the average wall thickness of the circumferential wall of the barrel portion 44 is 0.4 mm.

2) Regarding the Movement Amount of the Plunger Pu

The movement amount for shaping the container 41 (the distance between ho and h1 in FIG. 1) was 137 mm. The container 41 was molded by varying the suckback amount (the distance between h1 and h2 in FIG. 11) from 0 mm to 100 mm, and afterwards, the amount of the headspace HS formed in the container was measured. The diameter of the plunger Pu was set to 80 mm, and the moving speed of the plunger Pu was set to 100 mm/sec.

Figure 13:
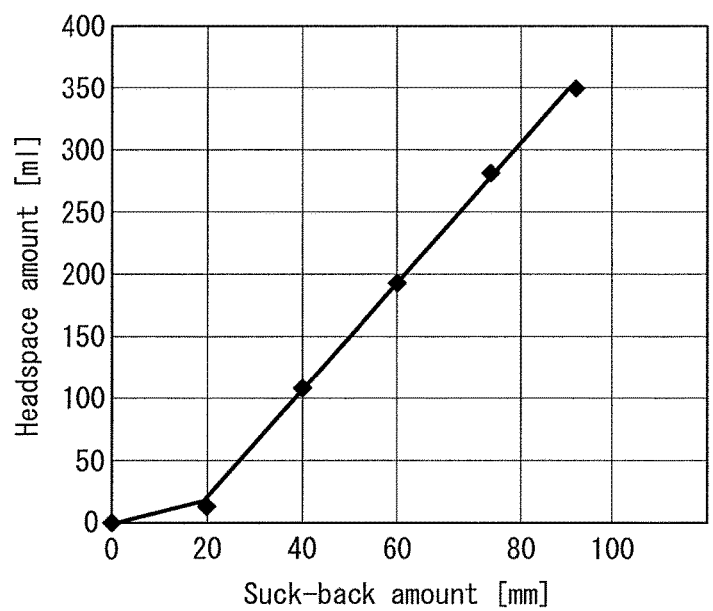
FIG. 13 is a graph showing the relation between the suckback volume of the plug in the plunger pump and the headspace amount in the molded container.

FIG. 13 shows the measuring results in the form of graph, with the horizontal axis being the suckback amount (mm) and the vertical axis being the headspace amount (ml).

The measuring results show that a hysteresis is observed when the suckback amount is around 20 mm, but there can be identified a linear relationship between the suckback amount and the amount of the headspace HS when the suckback amount is between 20 mm and 100 mm, which means that the amount of the headspace HS can be adjusted with the suckback mechanism SB with high precision.

Further, there is no need to mention that the configuration of the suckback mechanism SB provided to the plunger pump $21p$ is not limited in terms of the diameter, the movement amount, the suckback amount, the moving speed, etc., of the plunger Pu for shaping the container 41 in the aforementioned tests, and may be selected optionally from a number of variations in consideration of the volume of the container 41, the moldability of the container 41, the type of the content liquid, the amount of the headspace HS, the overall productivity comprising the disposing structure of the device, etc.

In addition, although a container in a round bottle body shape was used in the aforementioned tests, a container that is moldable with the blow molding device or with the manufacturing method of the present invention is not limited to the one in such a round bottle body shape, but may also be molded into a square bottle body shape or various shapes depending on the intended use.

However, if the volume of the headspace HS is enlarged, or an operation relating to the suckback is performed at high speed in view of the productivity, the circumferential wall may suffer a local depressive deformation, and such deformation may not be restored afterwards despite the introduction of a gas into the container, or may be whitened in a plastic-deformed portion even if the deformation was restored. In such cases, it is necessary to select the shape of the container, including the thickness of the circumferential wall, in consideration of the easiness of volume reduction deformation and the recoverability from the volume reduction deformation to its original shape.

Figures 14A, 14B:
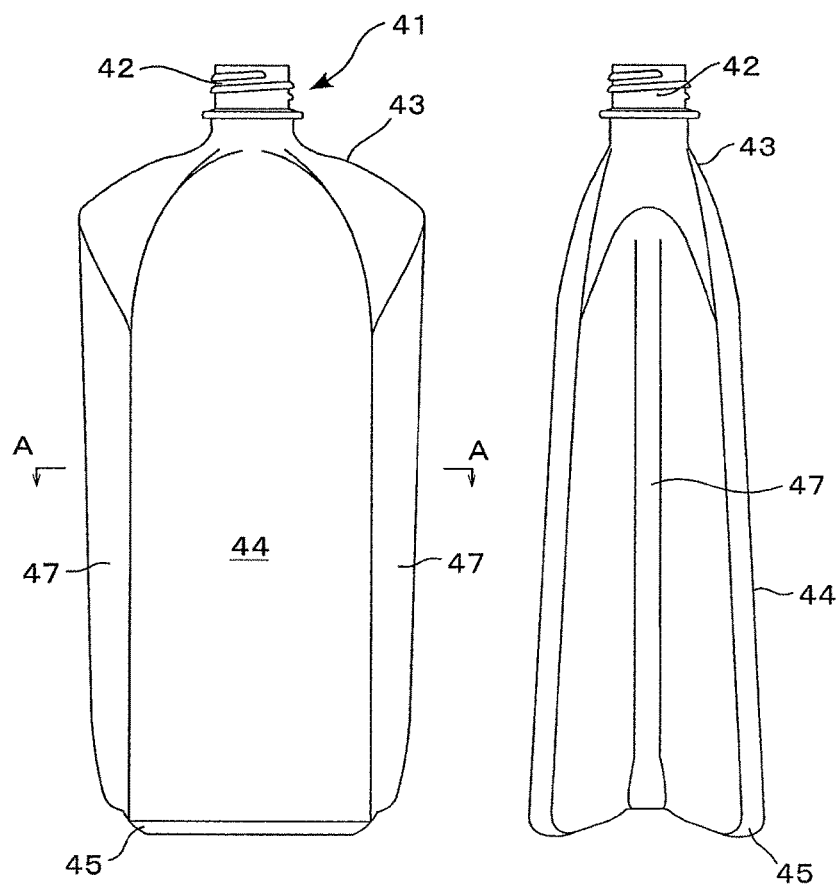
FIG. 14 illustrates another example of the container, in which (a) is a front view, (b) is a side view and (c) is a cross section view taken along the A-A line of (a)
Figure 14C:
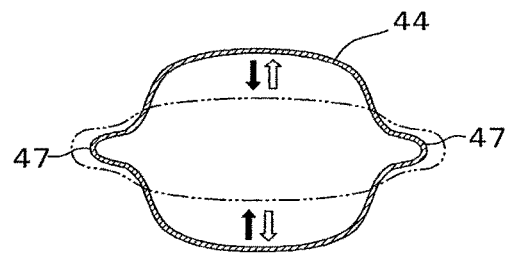
Figure 15:
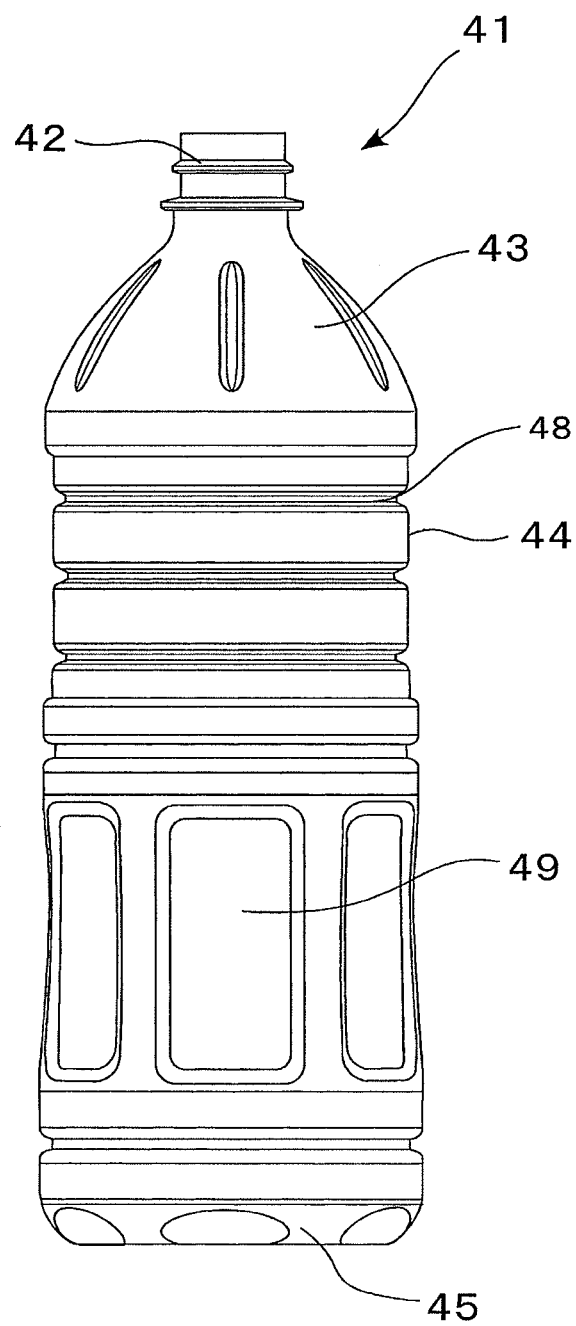
FIG. 15 is a front view illustrating another example of the container.
Figure 16:
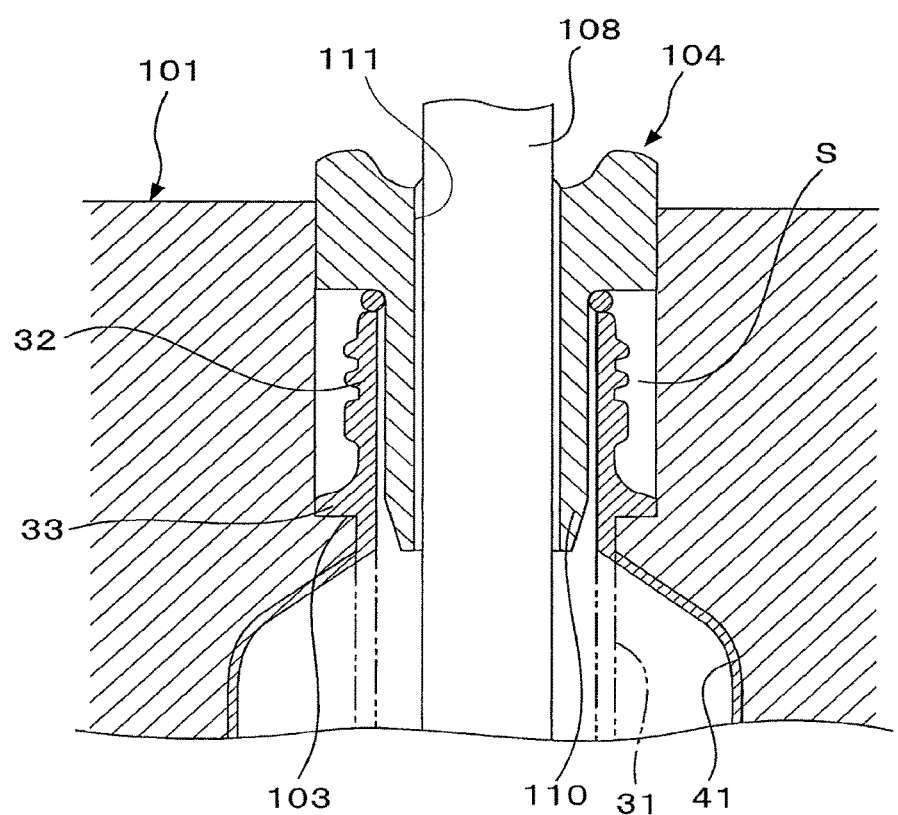
FIG. 16 is a cross sectional view illustrating the main part of an example of a conventional blow molding device using a blow air.

FIGS. 14 and 15 illustrate two examples of the aforementioned container, which are formed in consideration of the easiness of volume reduction deformation and the recoverability.

The container of FIG. 14 is a container 41 manufactured by preheating a PP random copolymer resin preform to 100° C. to 130° C. and then with the method for blow molding illustrated in the aforementioned FIGS. 6 to 10. FIG. 14(a) is a front view, 14(b) is a side view, and 14(c) is a horizontal cross section taken along the A-A line of FIG. 14(a).

The container 41 is in a pouch shape having a mouth tube portion 42, a shoulder portion 43, a barrel portion 44, and a bottom portion 45, with the overall height of 200 mm, the maximum diameter of 90 mm, and the nominal content of 500 ml.

As illustrated in FIG. 14(c), the horizontal cross sectional shape of the barrel portion 44 is flat as a whole in the front-back direction, and vertical ridges 47 are formed on the left end and the right end thereof to serve as column portions.

The circumferential wall of the barrel portion 44 is generally a thin wall having an average thickness of around 0.4 mm. In the suckback process in FIG. 8 and the process of removing the rod 8 in FIG. 9, volume reduction deformation occurs smoothly in the black arrow direction to render the front and rare flat circumferential walls flatter as illustrated with the two-dot chain line in FIG. 14(c), and then in response to the introduction of a gas at normal pressure, the container may be restored smoothly to its original shape in the hollow arrow direction.

On the other hand, the container 41 of FIG. 15 is in a round bottle body shape made of a PP random copolymer, which has a mouth tube portion 42, a shoulder portion 43, a cylindrical barrel portion 44, and a bottom portion 45, similarly to the container 41 of FIG. 12, with the overall height of 202 mm, the diameter of the barrel portion 44 of 66 mm, and of the nominal content of 500 ml.

The barrel portion 44 has four circumferential grooves 48 disposed in the upper half thereof, and six rectangular decompression absorbing panels 49 in a depressive shape disposed in the lower portion thereof.

By disposing the decompression absorbing panels 49 in this way, the decompression absorbing function thereof helps to avoid local depressive deformation in the circumferential wall resulting from volume reduction deformation caused by the suckback, to thereby allow the smooth transition from the volume reduction deformation to the restoration to its original shape.

In the above, embodiments of the blow molding device and the method for manufacturing a container using the same of the present invention are described referring to Examples. Of course, as mentioned for times in the above description, the present invention is not limited to the aforementioned examples, but may be selected from a number of variations.

For example, although the aforementioned Examples describe an example of molding a PP random copolymer resin container, it is also possible to use other resins that are excellent in biaxial stretching performance, such as PET resin, polyethylene naphthalate (PEN) resin, cyclic polyolefin resin, and the like.

In addition, regarding the molding device, the configuration of the blow molding device of the present invention is not limited to the examples of FIGS. 1 and 6, and may be selected optionally from a number of variations in consideration of the volume of the container, the moldability of the container, the type of the content liquid and the overall productivity, etc.

For example, although valve mechanism Vm is formed by abutting the seal body 9 to the seal step 6s in the examples of FIGS. 1 and 6, it is also possible to use valve mechanisms of various modes in consideration of the sealing capability, the operability relating to opening and closing, etc.

In addition, although the pressurized liquid feeding unit 21 employs the plunger pump 21p, and the plunger pump 21p is configured by including the suckback mechanism SB, the suckback mechanism SB may also be disposed separately from the pressurized liquid feeding unit 21, at a predetermined position in the feeding channel F of the liquid L from the pressurized liquid feeding unit 21 to the blow nozzle 4, in consideration of the productivity and the controllability of the headspace, etc.

Further, it is also possible to employ a configuration in which the liquid L remaining in the in-nozzle feeding channel Fs is circulated between the liquid adjusting unit 22 in a state where the valve mechanism Vm is closed as illustrated in FIG. 1, so as to suppress the variation in temperature of the liquid L to be fed into the preform 31 for shaping the container 41, to thereby stabilize the moldability of the container 41.

INDUSTRIAL APPLICABILITY

As described above, according to the blow molding device using a pressurized liquid and the method for manufacturing a container using the same of the present invention, the headspace of the molded container can be adjusted with high precision and productivity by means of a suckback mechanism, and thus the present invention is expected to contribute to widely expanding the application thereof in the field of blow molding using a pressurized liquid, in view of improving quality of the molded container filled with a content fluid and productivity.

REFERENCE SIGNS LIST 1 mold
2 cavity surface
4 blow nozzle
5 tube fitting piece
5a circumferential step
6 feed tube
6a introduction channel
6b intake hole
6s seal step
7a, 7b seal member
8 rod (stretching rod)
9 seal body
9a1, 9a2 shaft body
9t1, 9t2 tube sealing piece
9ta tapered edge
11 partitioning member
12 supporting flange piece
13 intake hole
21 pressurized liquid feeding unit
21p plunger pump
22 liquid adjusting unit
F feeding channel
Fs in-nozzle feeding channel
HS headspace
L liquid
LS liquid surface
P1, P2 piping
R1, R2 piping
Pu plunger
S space
SB suckback mechanism
Sv servo mechanism
V1, V2, V3 valve
Vm valve mechanism
do, d1, d2, d3, d4 position (of the tip of the rod)
ho, h1, h2 position (of the plunger)
31 preform
32 mouth tube portion
33 neck ring
41 container
42 mouth tube portion
43 shoulder portion
44 barrel portion
45 bottom portion
47 vertical ridge
44 circumferential groove
49 decompression absorbing panel
101 mold
103 neck supporting flange
104 blow nozzle
108 rod
110 guide tube portion
111 insertion hole

The invention claimed is:

1. A method for manufacturing a synthetic resin container, comprising: tightly fitting a blow nozzle into a mouth tube portion of a preform in a bottomed cylindrical shape which is installed into a mold for blow molding; and feeding a liquid into the preform from a pressurized liquid feeding unit through the blow nozzle so as to shape the container into an expanded shape along a cavity surface of the mold, the method comprising:
after the shaping of the container, drawing back the liquid inside the container to a pressurized liquid feeding unit side by means of a suckback mechanism disposed at a predetermined position in a liquid feeding channel from the pressurized liquid feeding unit to the mouth tube portion of the preform; closing the feeding channel by means of a valve mechanism disposed on the downstream side of the suckback mechanism; introducing a gas into the container to so as restore, to its original shape, the volume reduction deformation of the container resulting from the drawing back of the liquid; and adjusting a headspace inside the container through the amount of volume change associated with the volume reduction deformation.

2. The method for manufacturing a container according to claim 1, wherein the pressurized liquid feeding unit employs a plunger pump, and the plunger pump is provided with a suckback mechanism implemented through the drawing back operation of a plunger constituting the plunger pump.

3. The method for manufacturing a container according to claim 1 wherein the blow nozzle has a liquid feeding channel serving as an in-nozzle feeding channel, the in-nozzle feeding channel having a valve mechanism disposed therein.

4. The method for manufacturing a container according claim 1, further comprising, after closing the feeding channel by means of the valve mechanism, introducing a pressurized gas into the container so that the volume reduction deformation of the container is restored to its original shape.

5. The method for manufacturing a container according claim 1, wherein the blow nozzle comprising a stick-shaped rod that is inserted through the blow nozzle as being arranged in a manner movable along the axial direction of said blow nozzle, the method further comprising operating the rod to be inserted into the container and removed from the container to thereby complement the function of adjusting the headspace implemented by means of the suckback mechanism.

6. The method for manufacturing a container according to claim 5, further comprising using the rod as a stretching rod, and longitudinally stretching the preform by said stretching rod either before the process of shaping, with a liquid, the preform into an expanded shape or simultaneously with the process of shaping the preform into an expanded shape.

7. The method for manufacturing a container according to claim 1, further comprising configuring the container as a pouch-shaped and thin-walled container being made flat in a horizontal cross section in the barrel portion thereof.

8. The method for manufacturing a container according to claim 1, further comprising forming the container having a decompression absorbing panel disposed on a circumferential wall of the barrel portion thereof.

9. A blow molding device having a mold for blow molding and a blow nozzle tightly fitted into a mouth tube portion of a preform in a bottomed cylindrical shape which is installed into the mold, the device comprising:
   a pressurized liquid feeding unit configured to feed a liquid, via the blow nozzle, into the preform to product a shaped container in an expanded shape conforming to a cavity surface of the mold;
   a suckback mechanism disposed at a predetermined position in the liquid feeding channel from the pressurized liquid feeding unit to the mouth tube portion of the preform and configured to draw back liquid from the shaped container to the pressurized liquid feeding unit side;
   a valve mechanism is disposed on the downstream side of the position where the suckback mechanism is disposed, so as to open and close the feeding channel; and
   the blow molding device being configured to allow a pressurized gas to be introduced into the container, with the valve mechanism being closed.

10. The blow molding device according to claim 9, wherein the pressurized liquid feeding unit employs a plunger pump, the plunger pump being provided with a suckback mechanism implemented through a drawing back operation of a plunger constituting the plunger pump.

11. The blow molding device according claim 9, further comprising a valve mechanism disposed in an in-nozzle feeding channel serving as a liquid feeding channel inside the blow nozzle.

12. The blow molding device according to claim 11, wherein the blow nozzle comprises a rod-shaped seal body that is inserted into the blow nozzle as being arranged in a manner movable in the axial direction of said blow nozzle, the seal body is configured to abut against a seal step formed on the inner circumferential surface of the nozzle so as to close the in-nozzle feeding channel, and the tip of the seal body abuts against and detaches from the seal step so as to constitute a valve mechanism.

13. The blow molding device according to claim 12, wherein the seal body is obtained by inserting a rod into a cylindrical-rod-shaped axial body in a fluid-tight and slidable manner.

* * * * *